United States Patent [19]

Warsaw

[11] 4,177,978
[45] Dec. 11, 1979

[54] UNIVERSAL SHOP STAND WITH BREAKDOWN FEATURE

[76] Inventor: Arthur J. Warsaw, 131 E. Main St., Colfax, Ill. 61728

[21] Appl. No.: 892,994

[22] Filed: Apr. 3, 1978

[51] Int. Cl.² .............................................. B66F 5/04
[52] U.S. Cl. .................................... 269/17; 254/2 R; 254/134
[58] Field of Search ............... 254/2 R, 2 B, 2 C, 133, 254/134, 86 R; 269/17; 214/1 D, 130–132, 135; 248/352

[56] References Cited
U.S. PATENT DOCUMENTS

| | | | |
|---|---|---|---|
| 2,679,413 | 5/1954 | Johnson | 403/385 |
| 3,345,037 | 10/1967 | Sweetland | 254/86 R |
| 3,850,419 | 11/1974 | Craig | 254/134 |
| 3,949,976 | 4/1976 | Cofer | 254/134 |
| 4,123,038 | 10/1978 | Meyers | 254/134 |

*Primary Examiner*—Robert C. Watson
*Attorney, Agent, or Firm*—Emrich, Root, O'Keeffe & Lee

[57] ABSTRACT

The stand includes a rectangular base having a pair of parallel beams or rails. A pair of clamp fasteners are mounted to each end of the beams; and they may be adjusted longitudinally of the rails. Support wheels are mounted to each clamp fastener for vertical adjustment. At each end of the base, a pair of the clamp fasteners carries a vertical box frame between the rails. Each box frame telescopically receives and guides an adjustable vertical extension or slide which may be raised by a hydraulic ram. The clamps are mounted off vertical center on the box frames, so they may be reversed for further vertical adjustment. Other elements may be mounted to the base rails by the clamp fasteners.

9 Claims, 10 Drawing Figures

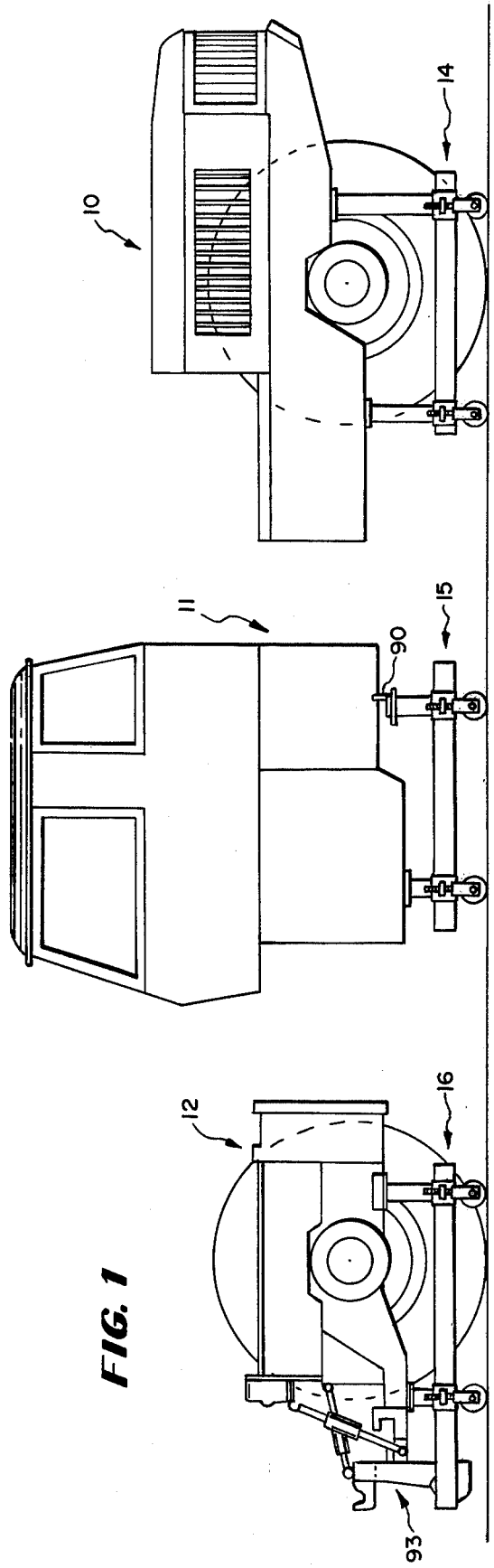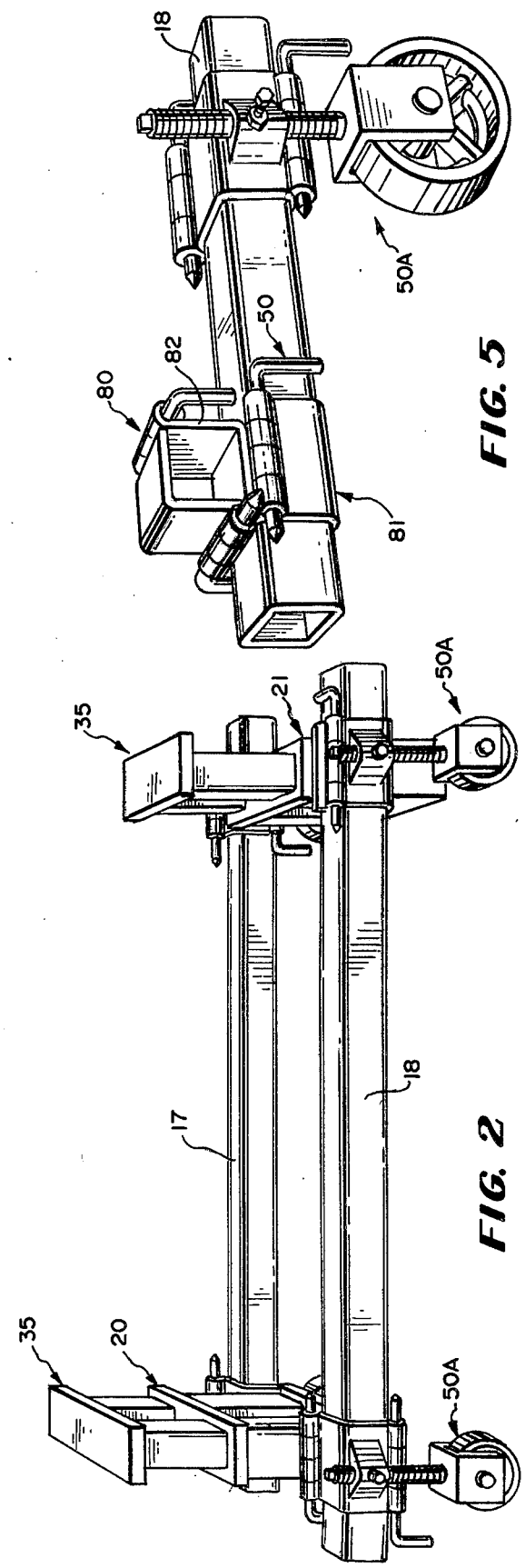

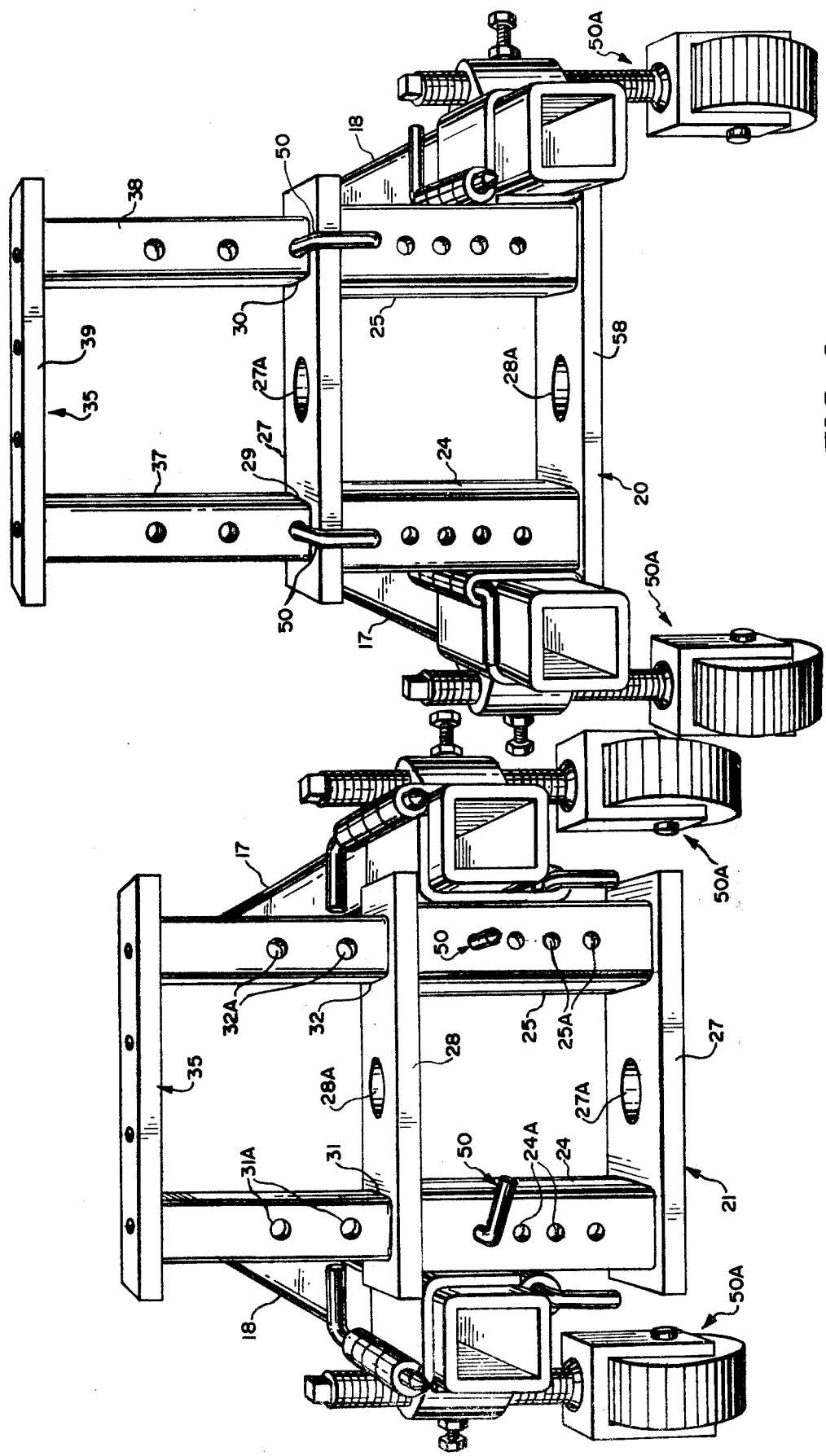

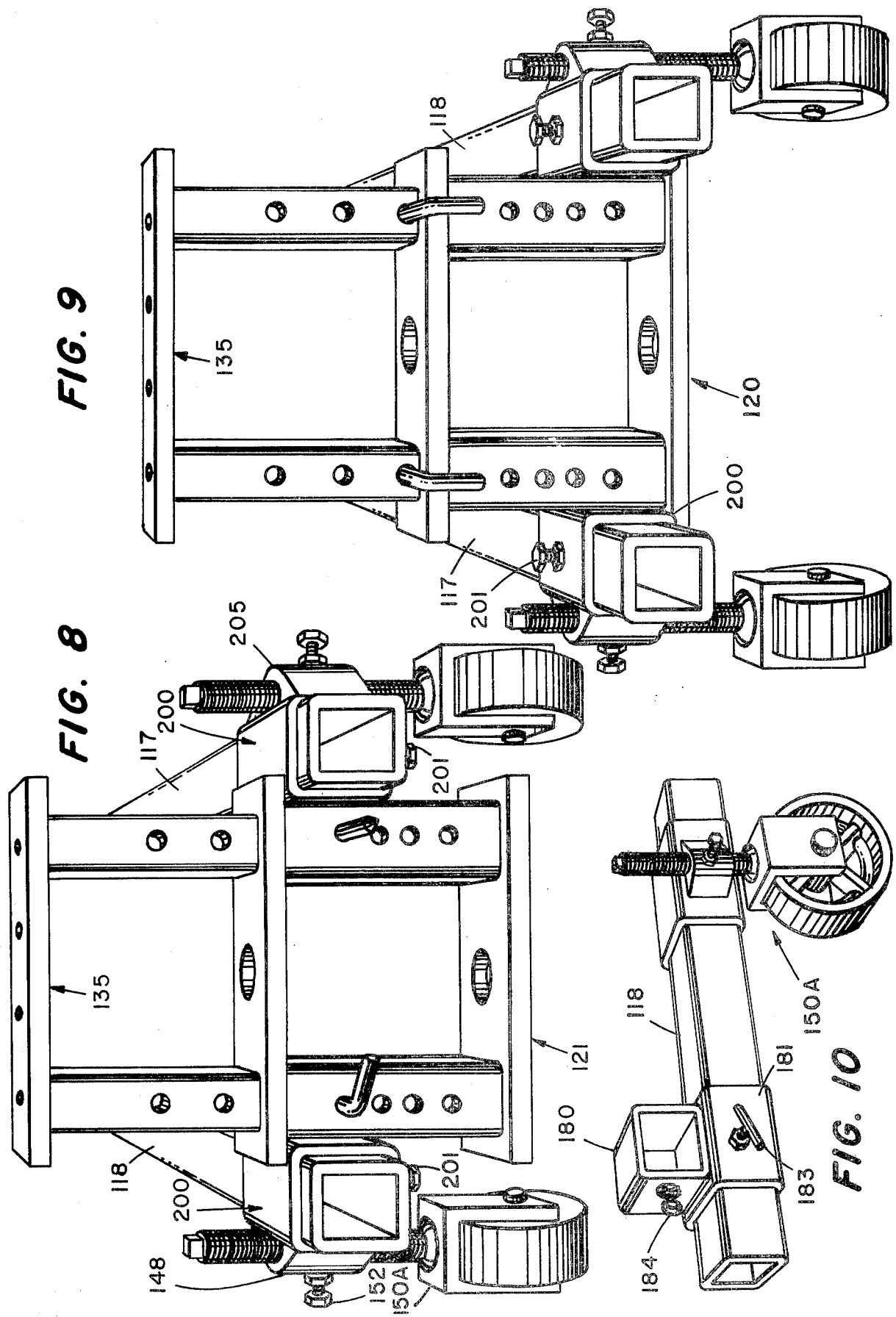

UNIVERSAL SHOP STAND WITH BREAKDOWN FEATURE

BACKGROUND AND SUMMARY

The present invention relates to a shop stand which is universal in application.

Shop stands which are presently commercially available are usually designed for specific situations, particularly when the intended function is to support heavy machinery, for example, the various parts of a large agricultural tractor. Such shop stands thus have the disadvantages, first, that they are not universal in application as they are usually designed only for a specific type of tractor or implement, and second, that when they are not in use they require a large amount of storage space. It is not unusual to find a complete working bay being occupied by a shop stand not in use.

Two of the principal objects of the shop stand of the present invention are that it be universal in application, and that it be easily broken down for storage in a number of separate elements or parts.

The stand of the present invention includes a base comprising a pair of parallel side beams or rails. A pair of adjustable clamp fasteners are mounted to each of the rails. The clamp fasteners carry support wheels, and they may be adjusted along the beams, depending upon the application.

Each pair of fasteners carries a box frame between the rails and the support wheels are located outside the rails. Preferably, the support wheels are in the form of wheel jacks, so that they may be adjusted in height by turning a threaded shaft. Each box frame telescopically receives an adjustable vertical extension which may be raised by a hydraulic ram. The clamps on the box frames are mounted off vertical center so that they may be reversed to fix the box frame in a high or a low position. This provides greater vertical adjustment range. The box frame and extension are each provided with a series of vertically spaced holes for receiving a pin to lock the extension in an adjusted vertical position. Other elements, such as cross frames or subsidiary hydraulic rams may be similarly mounted to the base beams by similar clamp fasteners. Thus, the present invention provides a jack stand which is universally adjustable in length and height over continuous ranges, with the height adjustment at each end being independent of the other.

Further, the construction provides a knockdown stand in that the end frames may be removed from the rails of the base by unlatching the clamp fasteners. Further, the extensions may be telescoped fully within the box frames for minimum storage, and the wheel jacks may be removed. The side beams of the base may thus be stored side by side for minimum storage space. In one embodiment, the clamp fasteners are formed from two angle sections with interlaced hinge elements on opposite corners for quick assembly and breakdown using angle lock pins. In another embodiment, the clamp fasteners are in the form of sleeves with threaded bolts which clamp to the rails when tightened.

Other features and advantages of the present invention will be apparent to persons skilled in the art from the following detailed description of a preferred embodiment accompanied by the attached drawing wherein identical reference numerals will refer to like parts in the various views.

THE DRAWING

FIG. 1 is a diagrammatic side view illustrating a tractor separated into three parts, each supported by a shop stand incorporating the present invention;

FIG. 2 is an upper side perspective of a shop stand incorporating the present invention;

FIGS. 3 and 4 are upper end perspective views of the shop stand showing the box frame in reversed positions respectively;

FIG. 5 is an upper side perspective view, taken partially from the rear, of a fragmentary portion of the shop stand illustrating a connection for an additional cross beam;

FIGS. 8 and 9 are upper end perspective views of a second embodiment of the shop stand, again showing the box frame in reverse positions respectively; and FIG. 10 is an upper side perspective view of a fragmentary portion of the shop stand of FIG. 8, illustrating a connection for an additional cross beam.

DETAILED DESCRIPTION

Figure 6:
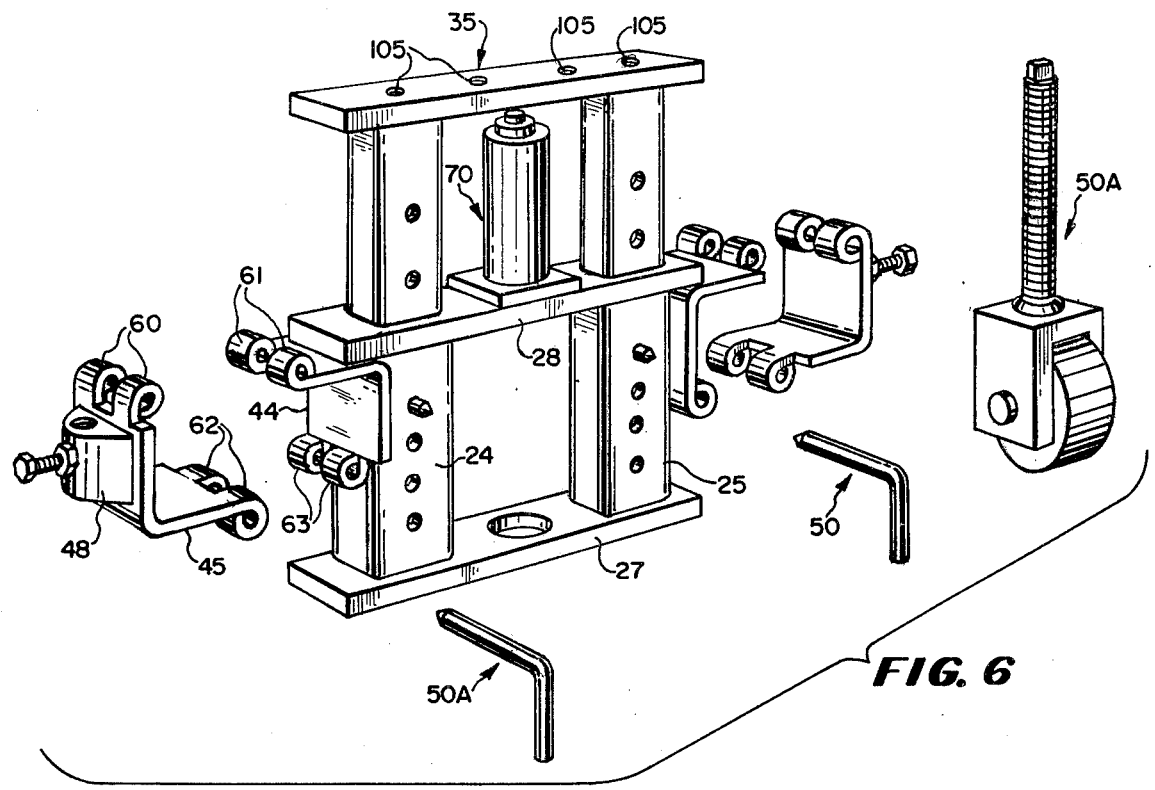
FIGS. 6 and 7 are side perspective views of the end box frames and extensions shown in the two positions of use, with various elements in exploded relation.

Referring first to FIG. 1, a tractor is shown as split into three major components, including the engine generally designated 10, the clutch housing and cab generally designated 11 and the torque divider and transmission generally designated 12. These three major components are each supported on a shop stand incorporating the present invention, the three shop stands being designated respectively 14, 15 and 16.

Each of the stands 14–16 may be similar in construction, with modifications to suit the individual application; and these modifications and the particular adaptations will be described after the universal stand is described in detail.

Referring now to FIG. 2, the shop stand includes first and second elongated beams or rails 17, 18. The size, wall thickness and length of these beams may be modified depending upon the application, but they may be typically 48 in. long and 3 ½ in. square (outer dimension). The beams or rails 17, 18 are held rigidly in spaced, parallel relationship by a pair of end box frames generally designated 20, 21. Each of the box frames is similar in structure as will be appreciated from a comparison of FIGS. 3 and 4, except that they are in vertically reversed positions. That is, the box frame 21 is in the "low" position. Thus, only the box frame 20 need be described in further detail for an appreciation of the invention.

Turning then to FIG. 4, the box frame 20 includes first and second upright tubular supports 24, 25, both of which are made from tubular steel beams. Upper and lower crossbars 27, 28 are welded to the ends of the support members 24, 25; and apertures, such as those seen at 29, 30 in FIG. 4 (and 31, 32 in FIG. 3) are cut in the crossbars 27, 28 in register with the hollow center of the support tubes 24, 25. These apertures in the cross frame members are sized to fit an extension generally designated 35.

The extension 35 is a rigid component including first and second tubular members 37, 38, the upper ends of which are welded to a crossbar 39. The tubular members 37, 38 may have the same cross sectional shape as the tubular supports 24, 25 of the box frame 20, and be dimensioned so as to be telescopically received and supported by the upright support members 24, 25 of the box frame.

Figure 7:
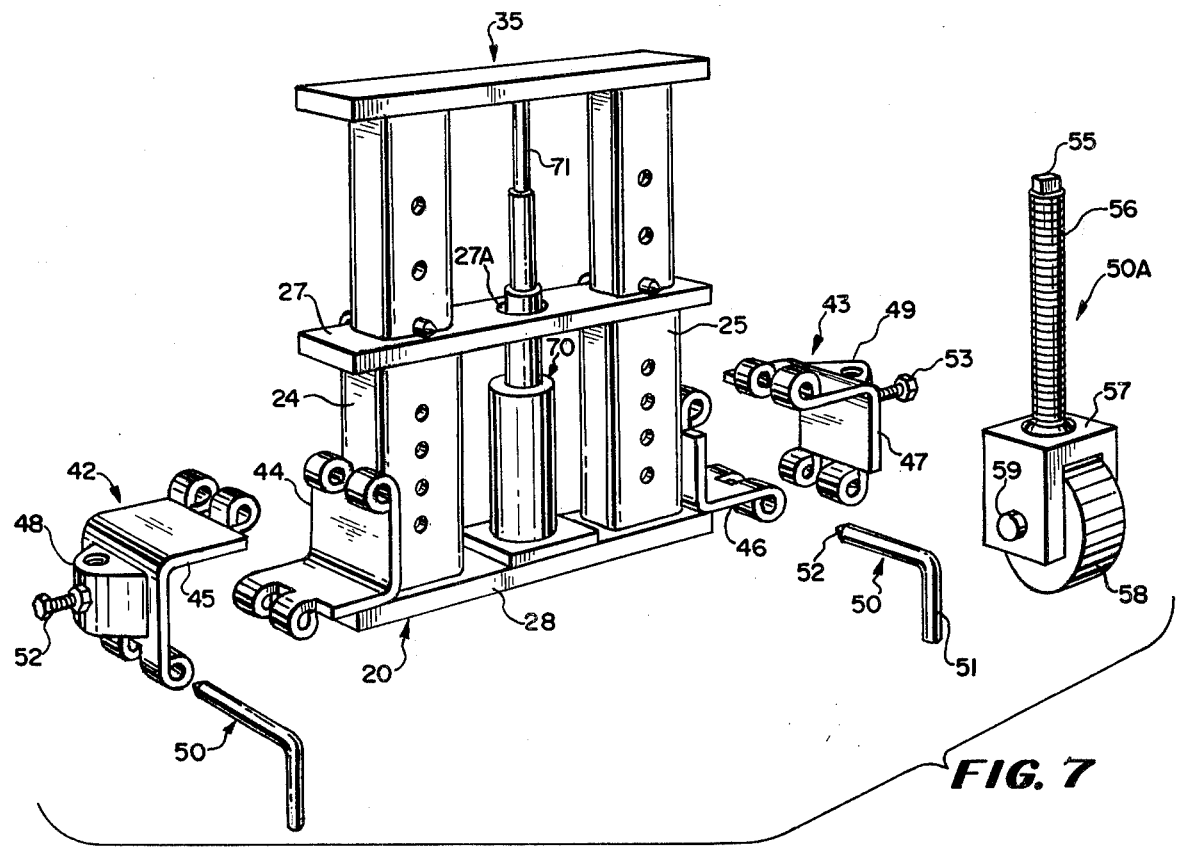

As best seen in FIGS. 6 and 7, one section of a split hinge clamp is welded to the outer surface of the tubular support members 24, 25 of the box frame 20. The two hinge clamps are generally designated respectively 42, 43 and they are similar in structure. The hinge clamp 42 includes two angle sections 44, 45, and the section 44 is welded to the box frame 20. Similarly, the hinge clamp 43 includes one section 46 which is welded to the box frame 20 and a second section 47. Each of the hinge sections includes rolled hinge elements which have apertures which align when the hinge elements are interlaced. A lock pin 50 is placed at diametrically opposite locations for securing the box frame to the base beams 17, 18. In its preferred form, the pins 50 are bent to form a handle 51 and each pin includes a tapered lead-in section 52 for guiding into the associated hinge sections, and forcing the two hinge sections together in clamping relationship on the beams.

It will be observed that the horizontal center line of the split hinge clamps 42, 43 is located below the horizontal center line of the box frame 20 in the position of FIG. 7 so that the upper cross frame 27 in this position extends well above the beams 17, 18 (see FIG. 4). When the box frame is turned over, as seen in FIG. 3, the cross bar 28 is on top, and it assumes a lower position relative to the beam 17, 18.

As best seen in FIGS. 6 and 7, the complementary removable clamp sections 45, 47 are each provided with an internally threaded boss 48, 49 respectively for receiving the threaded shafts of wheel jacks, one of which is generally designated 50A in FIGS. 6 and 7. Each of the threaded bosses is further provided with a threaded lock bolt 52, 53 for securing the respective wheel jack after it is adjusted in height. Height adjustment is achieved by turning a square lug portion 55 above the threaded shaft 56. The bottom of the threaded shaft 56 is welded to a wheel carriage 57, in which a heavy duty wheel 58 is mounted by means of an axle pin 59. Caster wheels may also be used.

Referring now particularly to FIG. 6, it will be observed that the hinge section 45 includes a pair of hinge cylinders or elements 60 which are formed to interlace with a corresponding pair of hinge rings 61 on the hinge section 44. Similarly, a pair of hinge elements 62 on the hinge section 45 interlace with hinge rings 63 on the hinge section 44. When the hinge sections are assembled, the interlacing rings have their apertures aligned to receive the lock pins 50, described above, in clamping relationship with the associated rail or beam. It will be appreciated that the hinge axes are located at generally diametrically opposite positions so that the hinge sections are similar to one another and easily assembled and disassembled. When assembled to a rail and the pins are placed in the hinge elements, a wedge action forces the elements together to clamp the rail.

Referring back to FIGS. 3 and 4, the crossbars 27, 28 on the box frame 21 are each provided with an aperture, designated 27A and 28A respectively which are vertically aligned.

In use, a hydraulic ram 70 may be placed on the lower crossbar with an extension 71 extended through the upper aperture 27A for raising the extension 35, as best seen in FIG. 7. Alternatively, the ram 70 without an extension may rest on the upper crossbar (designated 28 in FIG. 6 because the box frame is reversed), for raising the extension 35. The box frame may be used in either the high or low position with the hydraulic ram resting on either the upper or lower crossbar.

Referring back to FIG. 2, it will be observed that the wheel jacks 50A located in all four corners of the stand are the same. Further, the box frames 20, 21 are identical, and each is fitted with an extension 35. All of the clamp elements for each corner may also be identical. Hence, the present invention employs a relatively few number of standard parts which are used repeatedly, and it breaks down easily and rapidly into individual elements which are stored in a minimum of space.

Referring to FIGS. 3 and 4, the tubular frame elements 24, 25 are each provided with a series of aligned apertures which are vertically spaced, and designated respectively 24A and 25A. Each of the apertures seen is provided with a corresponding aperture on the other side of the tubular element for receiving one of the lock pins 50. The extension 35 is similarly provided with spaced apertures 31A on the leg 31 and 32A on the leg 32 for aligning with associated apertures 24A, 25A respectively. As seen in FIG. 4, the lock pin 50 may rest on the top of the upper crossbar 27 and need not pass through the apertures in the tubular support elements 24, 25.

To assemble the stand, the height of the clamp sections on the wheel jacks may be adjusted so that the rails 17, 18 are at the desired height. The box frame 21 may then be assembled to the wheel jacks by means of the two complementary clamp sections secured to it. This is true if it is desired to use the box end frame in the low position of FIG. 3. If it is desired to use the box end frame in the high position of FIG. 4, the box end frame may be rested on a support while the clamp sections on the wheel jacks are adjusted to the desired height prior to assembling the box frame.

One of the features of the present invention is that it readily lends itself to modification by adding additional components or functional elements. For example, referring to FIG. 5, if a crossbar is desired to be added to the main frame, a pair of hinge clamps 80, 81 may easily be joined together by welding one section 82 of the upper, transverse hinge clamp 80 to the outer surface of one of the sections of the lower hinged clamp 81. The lower hinged clamp is then assembled to the rail 18 of the main frame, and a crossbar of similar construction may be assembled to the upper hinged clamp 80. By reversing the position of the hinge clamp 81, the hinge clamp 80 may be located beneath the rail 18, if it is desired to have a cross beam beneath the rectangular base frame of the stand. Such a cross frame member may be useful, for example, in adapting the stand for carrying wheel assemblies (with or without axle housings) which sometimes have to be removed from a tractor. If the tractor is large, and it is provided with dual wheels, a dual wheel assembly of this type will weigh hundreds of pounds. It will be observed that the crossbar is easily adjustable longitudinally of the side rails 17, 18 with this structure.

For purposes of adjusting the hinge clamps of the first embodiment longitudinally of their respective side rails, pins of smaller diameter than the lock pins 50 may be provided. Such pins may be slipped into the mating hinge members and fit loosely, thereby providing a loose fit of the clamp fastener which may be slid longitudinally of its respective side rail. The smaller pins may be removed by driving the lock pins 50 into place, once the adjustment is achieved. With the structure shown in FIG. 5, outriggers may be supplied to the stand by including a cross frame member beneath the rectangular base frame including side rails 17 and 18 to provide greater stability to the stand. An adjustable screw having a round foot or pad adapted to contact the floor may be mounted to the cross frame member for outrigger support. Further components can be added by welding to one or the other sections of the hinge clamps, or by adding other hinge clamps.

Referring back to FIG. 1, still further adaptability of the universal stand will be appreciated. For example, the stand 14 may have the forward guide in the high position and the rear guide in the low position, shown only diagrammatically in the drawing. The forward extension may be provided with a bar secured over end with a cap screw for engaging the engine block.

The center stand 15 has both box frames in the low position, but the forward extension is provided with an angle iron 90 secured to the upper crossbar 39 of the vertically adjustable extension 35. Toward this end, the crossbar 39 may be provided with tapped holes as at 105 in FIG. 6 which extends laterally beyond the stand for stability in supporting wider sections such as the clutch housing.

The rear stand 16 may use longer rails, as illustrated, and have the rear extensions of the rails bolted to the draw bar of the tractor, generally designated by reference numeral 93.

Referring now to the embodiment of FIGS. 8-10, it is similar to the embodiment already described except that an alternative form of fastener is used. Hence, elements similar to those already disclosed need not be further described, and similar reference numerals are used except they are preceded by a "1". Thus, the side rails are designated 117 and 118 respectively, the box frames are designated 120 and 121, and the extensions which are slidably received in the box frame are designated 135.

A pair of clamp fasteners 200 are slidably received on the side rails respectively, and they are similar in structure. Each includes a closed section in the form of a tube or sleeve received on the associated side rail, and provided with a lock bolt 201 which, when tightened, secures the sleeve to the rail. Each of the fasteners includes an internally threaded boss 148 for receiving the threaded shaft of a wheel jack, generally designated 150; and a threaded lock bolt 152 is used to secure the wheel jack after it is adjusted in height. As before, the sleeve fasteners 200 are welded to the box frame 120, shown respectively in reversed vertical positions in FIGS. 8 and 9.

This type of sleeve fastener is shown in FIG. 10, adapted for receiving a cross frame above the rail 118. Toward this end, a lower sleeve 181 is welded to an upper sleeve 180, and each is provided with a lock bolt designated 183 and 184 respectively for clamping to an associated box beam.

It will thus be appreciated that the present invention provides a sturdy, yet convenient and economical, adjustable shop stand which is universal in application and yet which is quickly and easily broken down or reassembled. Further, the stand employs a number of identical parts used in different sections of the stand.

Having thus disclosed in detail a preferred embodiment of the invention, persons skilled in the art will be able to modify certain of the structure which has been illustrated and substitute equivalent elements for those disclosed while continuing to practice the principle of the invention; and it is, therefore, intended that all such modifications and substitutions be covered as they are braced within the spirit and scope of the appended claims.

I claim:

1. A shop stand comprising: first and second elongated side rails; first and second end frame means, each frame means including upright guide means and an extension received in said guide means for sliding adjustment in a vertical direction; means for locking each of said extensions to its associated guide means in an adjusted vertical position, said guide means of each end frame means being independently adjustable; first and second releasable clamp means for securing said first end frame means to said rails at an adjusted axial position, said clamp means being slidable along said rails in a loosened position; third and fourth releasable clamp means for mounting said second end frame means to an adjusted axial position on said rails; said third and fourth releasable clamp means mounted to said guide means of said second end frame means at a vertically offset position relative to a horizontal center line thereof, whereby said second end frame means may be mounted either in a relatively high or a low position in respect of said side rails using said third and fourth clamp means; said extension of said second end frame means being telescopically received in either end of said guide means therefor and being independently adjustable relative to said guide means whether said guide means is mounted in said high or low positions; and wheel support means carried by each of said clamp means.

2. The apparatus of claim 1 wherein each of said end frame means comprises a box frame having first and second upright tubular members; and upper and lower crossbars rigidly secured to the ends of said tubular members and each defining apertures in register with the openings in said tubular members, whereby said tubular members serve as guides for an associated extension.

3. The apparatus of claim 2 wherein each of said extensions includes first and second upright members slidably received respectively in said tubular members of an associated end frame and a rigid crossbar secured to the upper ends of said upright members.

4. The apparatus of claim 3 wherein said rigid crossbar of said extension includes a plurality of tapped apertures for receiving bolts for securing attachments to said extension.

5. The apparatus of claim 1 wherein each of said clamp means comprises a pair of interconnecting hinge sections, each in the form of an angle, each hinge section defining pin-receiving means aligned with the pin-receiving means of the mating hinge section when assembled to said base, said hinge sections being at diametrically opposite portions of the assembled hinge; and a pair of pins slidably received in each of said hinge elements.

6. The apparatus of claim 1 wherein each of said support wheel means comprises a wheel jack having an elongaged, externally threaded shaft threadedly received in an associated fastener means, and adapted for vertical adjustment therein.

7. In a breakdown shop stand, the combination comprising: an elongated tubular frame member of known cross-section; a hinge clamp having first and second interconnecting sections each adapted to conform to a partial circumference of the exterior of said rail member and adapted to clamp thereto, each hinge section providing first and second aligned pin-receiving hinge elements generally diametrically opposite one another in the assembled position; a transverse rigid frame member secured to one of said hinge sections; and first and second pin means for removably interconnecting said hinge sections together by being received into said aligned hinge elements.

8. The apparatus of claim 7 further comprising a jack wheel threadedly secured to the other of said hinge sections for vertical adjustment.

9. A shop stand comprising: first and second elongated side rails; first and second end frame means, each end frame means including upright guide means and an extension received in said guide means for sliding adjustment in a vertical direction; means for locking each of said extensions to its associated guide means in an adjusted vertical position, said guide means of each end frame means being independently adjustable; first and second releasable clamp means for securing said first end frame means to said rails at an adjusted axial position; third and fourth releasable clamp means for mounting said second end frame means to an adjusted position on said rails; each of said clamp means comprising a pair of interconnecting hinge sections, each in the form of an angle, each hinge section defining first and second pin-receiving means aligned with the pin-receiving means of the mating hinge section when assembled to one of said rails, said pin-receiving means being at diametrically opposite portions of the assembled hinge; and a pair of pins slidably received in the pin-receiving means of each pair of cooperating hinge sections; and wheel support means carried by each of said clamp means.

* * * * *